US011645165B2

(12) United States Patent
Srinivasan

(10) Patent No.: US 11,645,165 B2
(45) Date of Patent: May 9, 2023

(54) PROXY DEPLOYMENT BASED UPON THE ACTUAL NUMBER OF PROTECTED VIRTUAL MACHINES

(71) Applicant: EMC IP Holding Company LLC, Hopkinton, MA (US)

(72) Inventor: Sharath Talkad Srinivasan, Brundavanagar Bengaluru (IN)

(73) Assignee: EMC IP Holding Company, LLC, Hopkinton, MA (US)

( * ) Notice: Subject to any disclaimer, the term of this patent is extended or adjusted under 35 U.S.C. 154(b) by 765 days.

(21) Appl. No.: 16/155,453

(22) Filed: Oct. 9, 2018

(65) Prior Publication Data

US 2020/0110672 A1 Apr. 9, 2020

(51) Int. Cl.
*G06F 11/14* (2006.01)
*G06F 9/455* (2018.01)
*H04L 67/00* (2022.01)
*H04L 67/59* (2022.01)

(52) U.S. Cl.
CPC ...... *G06F 11/1464* (2013.01); *G06F 9/45558* (2013.01); *G06F 11/1451* (2013.01); *G06F 11/1453* (2013.01); *G06F 11/1469* (2013.01); *H04L 67/34* (2013.01); *H04L 67/59* (2022.05); *G06F 2009/45575* (2013.01); *G06F 2201/815* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 9,628,561 B1* | 4/2017 | Kulkarni | G06F 11/1464 |
| 9,785,510 B1* | 10/2017 | Madhavarapu | G06F 3/065 |
| 2015/0040131 A1* | 2/2015 | Shan | G06F 9/45533 718/1 |
| 2017/0091045 A1* | 3/2017 | Bangalore | G06F 11/1461 |
| 2018/0285203 A1* | 10/2018 | Cox | G06F 11/1461 |

* cited by examiner

*Primary Examiner* — Wynuel S Aquino
(74) *Attorney, Agent, or Firm* — Barry N. Young

(57) ABSTRACT

In a backup system for a virtual infrastructure, the actual number of virtual machines protected by a backup server is determined for a given instant of time, and is used to calculate the number of virtual proxies required to protect the that actual number of virtual machines, and to deploy automatically the required virtual proxies in the virtual infrastructure.

19 Claims, 2 Drawing Sheets

PROXY DEPLOYMENT BASED UPON THE ACTUAL NUMBER OF PROTECTED VIRTUAL MACHINES

BACKGROUND

This invention relates generally to enterprise backup and storage systems, and more particularly to optimizing a virtual enterprise storage system that manages the backup and recovery of enterprise data to a backup storage system.

A virtualized system comprising a virtual infrastructure which hosts a plurality of virtual machines ("VMs") are frequently used to offload the task of managing the backup and recovery of an enterprise data storage system to free the associated enterprise system to perform its primary data processing and storage function. A typical virtual infrastructure may host several thousand VMs in a virtual center ("VC"). The VMs have associated virtual machine disk drives ("VMDKs") for data, and are backed up by taking snapshots of their VMDKs. Virtual proxies ("vProxies") are typically deployed by a backup server of the enterprise to manage backup of VMs and to serve as a mediator between the VMs and the backup server and to protect the VMs in the VC. A vProxy (also referred to herein simply as a "proxy") is a virtual appliance that assists in backing up a VM. Backup snapshots of the VMDKs are attached to a vProxy, which transfers the data to the backup server. Without a vProxy handling the snapshots, the VMs would be unavailable for production processing until the entire data transfer to backup is complete. The number and deployment of vProxies is based upon the entire VC topology.

A proxy deployment manager ("PDM") is the preferred way of estimating the number of vProxies required to protect the VMs in the VC, and deploying the vProxies. As will be described below, the PDM estimates the required number of vProxies based upon the number of available VMs in the entire VC, and calculates the number of vProxies that are required to handle that number of available VMs. For instance, if a virtual infrastructure hosts three thousand VMs, the PDM will calculate the number of vProxies required to protect all three thousand VMs, and recommend deployment of this number of vProxies. However, not all of the calculated number of available VMs may be necessary as the actual number of VMs needed may be less than calculated, so if the recommended number of proxies is deployed, there may be a number of proxies sitting idle and unused. An incorrect recommendation by the PDM of the number of required vProxies can result in consuming unnecessarily resources in the VC to deploy and track the vProxies. Moreover, manual proxy deployment is tedious subject to human error.

It is desirable to provide approaches that address and avoid the foregoing and other problems in determining and deploying the required numbers of vProxies to handle optimally the back up of a virtual infrastructure, and it is to these ends that the present invention is directed.

DESCRIPTION OF PREFERRED EMBODIMENTS

The invention is particularly well adapted for use with a VMware® virtual infrastructure and with a Data Domain deduplication and backup storage system of Dell Technologies, Inc. and will be described in that context. However, it will be appreciated from the description that follows that the invention is applicable to other virtual infrastructures and to other backup and storage systems.

As will be described, the invention determines the actual number of VMs protected by a backup server, calculates the number of vProxies required, and recommends and deploys vProxies based upon the actual number of VMs protected by a backup server. In an embodiment, this may be done by collating the VMs protected at a policy level based on the number of VM's protected by all the policies on the backup server for a VC, and basing a recommendation and deployment based upon the same. Given this recommendation, in an embodiment the deployment of proxies may be done completely dynamically and automatically because the determination of the required number will be based upon the actual number of VMs in the VC at a particular time, and the deployment may be varied dynamically as needed.

Figure 1:
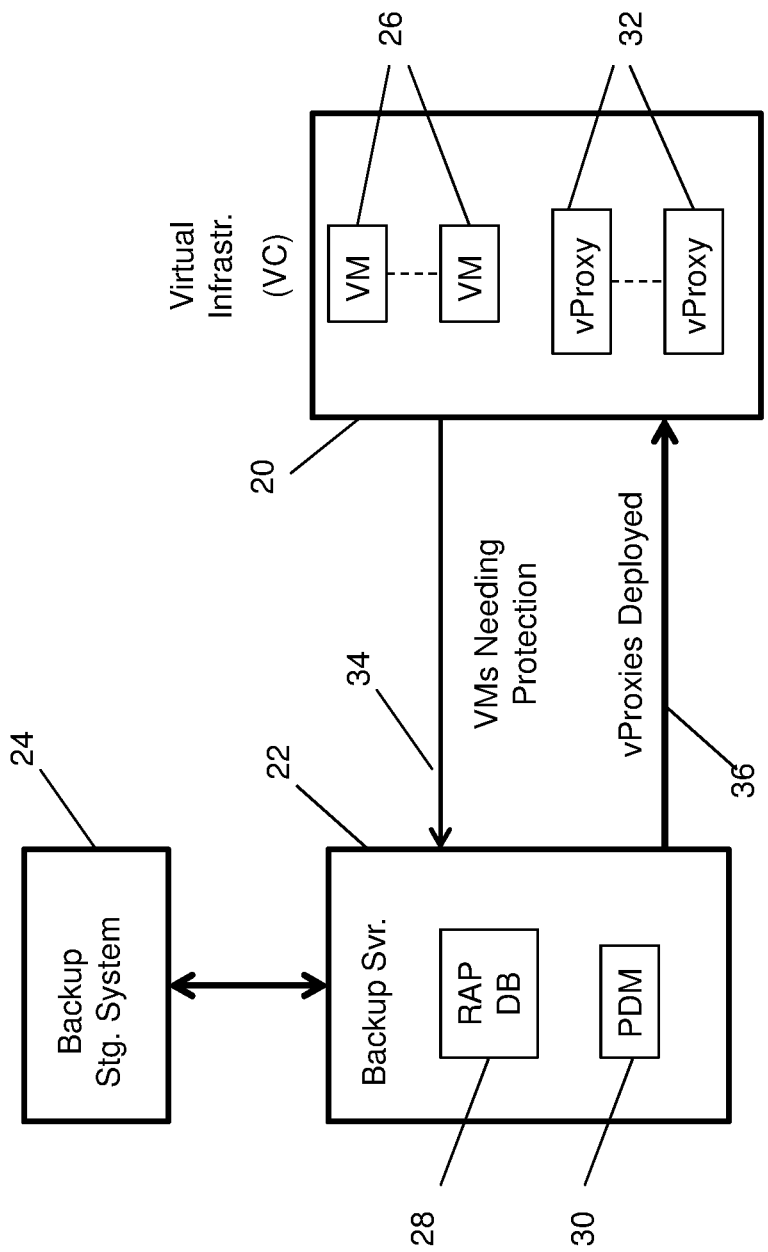
FIG. 1 is a functional view of a backup system in accordance with an embodiment of the invention for a virtual enterprise storage system.

FIG. 1 is a functional view of a backup system in accordance with an embodiment of the invention for a virtual enterprise storage system. As shown in the figure, the system may comprise a virtual infrastructure or virtual center (VC) 20, a backup server 22, and a backup storage system 24. The VC 20 may comprise virtualization appliance software, as from VMware, that runs on physical servers having associated non-transitory computer readable media storing executable instructions which control the physical servers to abstract processor, memory storage and networking resources. The VC is formed to manage multiple physical and virtual hosts and storage, and may host a plurality of virtual machines (VMs) 26 which may be on physical or virtual servers that are managed by the VC. The VMs may be protected by the backup server, and may have associated vProxies 32 which are automatically and dynamically deployed on the VC by the backup server 22, as will be described.

The backup server 22 may comprise a physical machine. A primary function of the backup server is to manage the backup of VMs hosted on the VC to the backup storage system 24. Backup storage system 24 preferably comprises a Dell/EMC DataDomain backup appliance that deduplicates data so that redundant copies of the same data are not stored. This reduces the amount of data transferred over the network to physical storage devices, and reduces the required storage capacity.

Backup server 22 may have a media database 28 that stores backup related components of the VC and enables selection at any time of only those VMs that are selected for backup. For instance, if there are one hundred available VMs on the VC but it is decided to back up only twenty-five of them, only the information for these twenty-five needs to be in the media DB. As described below, these are the VMs that are actually protected by the backup server. The media DB is preferably a RAP ("Rice Annotation Project") database because this type of DB helps accelerate diagnostics and reporting.

Backup server 22 also comprises a proxy deployment manager ("PDM") 30 comprising software executing in the backup server. The main function of the PDM is to calculate the number of vProxies ("proxies") 32 required to manage the VMs in the virtual infrastructure which need to be protected by the backup server, and to recommend to the user deploy this number of proxies. A typical virtual infrastructure may host several thousand VMs, and known PDMs currently calculate the recommended number of proxies based upon the number of VMs available and by taking into consideration a number of different factors. The PDM first determines at 34 the number of available proxies in the virtual infrastructure by a point-in-time analysis of the entire infrastructure. Second, it obtains a user-defined data change rate (the percentage of a client file system that changes between backups); third, a data ingestion rate is obtained (either predetermined or user defined) as the number of proxies required to successfully back up all required VMs in the time allotted by the backup window; and fourth, the number of proxies required to protect against over commit is determined as the number of vProxies required to sustain normal backup operations at a partial level-1 or changed block backup as opposed to a full backup. The PDM calculates a recommendation for the number of vProxies using these four factors.

There are several problems with the way a PDM currently calculates vProxy recommendations and the way in which they are deployed. Proxy recommendations are currently calculated based upon the available number of VMs for the entire VC, rather than the number of VMs actually protected by the backup server. This can result in an incorrect recommendation to deploy proxies that are unnecessary and are not used, consuming unnecessarily available resources in the VC and the backup server to deploy and monitor unneeded proxies. Also, the user has to decide whether to accept the recommendation or to ignore it, and then must manually deploy at 36 the number of proxies deemed necessary. Manual deployment and registration of a proxy with a server is tedious and is subject to error, and entails delay.

Figure 2:
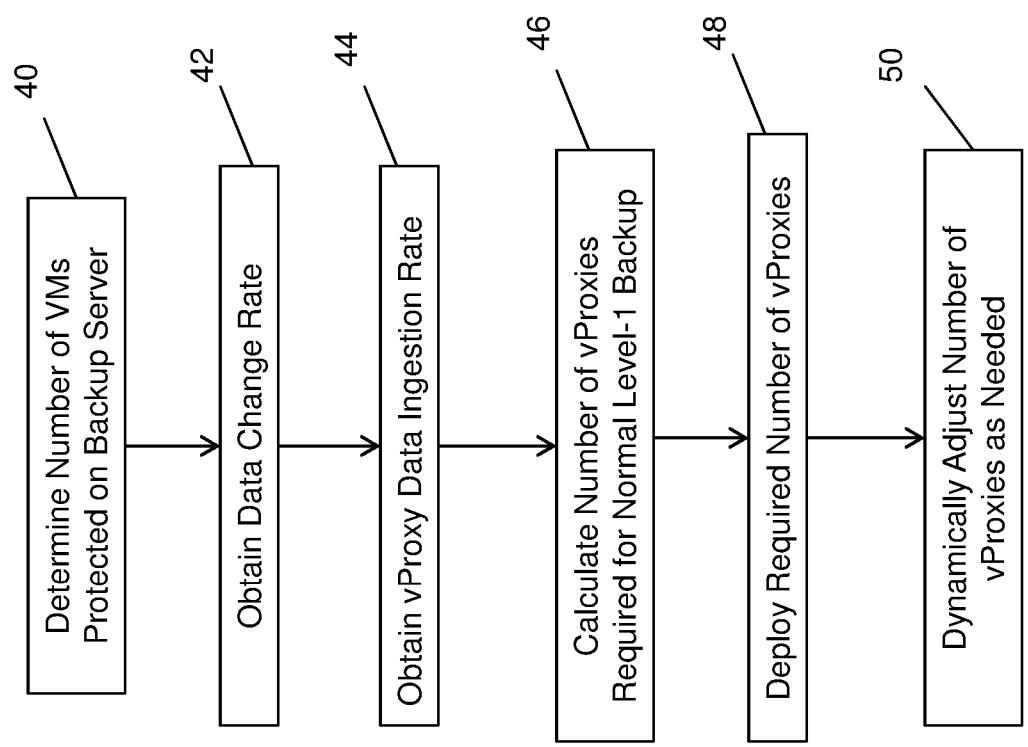
FIG. 2 is a workflow diagram of a process in accordance with an embodiment of the invention for managing vProxies for backup.

The invention uses a different approach to proxy deployment. FIG. 2 is a workflow diagram of a process in accordance with an embodiment of the invention for managing vProxies for backup which may be used in the system of FIG. 1. In contrast to the current way in which proxies are deployed, the invention does not calculate a recommended number of proxies based upon the available number of VMs in the virtual infrastructure as in the first step described above for a conventional PDM. Instead, the invention determines at 40 the number of VMs in the infrastructure that is actually protected at any instant in time by the backup server across all policies. This is preferably done by querying the media DB 28 of the backup server. At 42 the data change rate is obtained, and at 44 the proxy data ingestion rate is obtained. At 46 the recommended number of proxies that are required to protect against proxy over commit is calculated based upon the expected number of level-1 backups. Collating the protected VMs by all or a plurality of policies of the VC and considering the foregoing parameters determine as described above gives an exact number of vProxies that are required to protect these VMs. It is significant that the invention determines the actual number of proxies required at a particular instant of time rather than estimating a recommended number based upon available VMs. Since the process of FIG. 2 determines an exact number of proxies required rather than an estimate, based upon a point-in-time analysis of the virtual infrastructure, in an embodiment the invention may dynamically and automatically deploy the required number of proxies as needed at 48, thereby avoiding unwanted delay and the possibility of human error.

Moreover, as needs change, the number of vProxies may be periodically and dynamically adjusted at 50 depending upon the number needed at any instant of time. For example, if the number of protected VMs increases, vProxies may be automatically spawned as required. Similarly, if the number of VMs decreases the backup server may place already deployed unneeded vProxies in a suspended state so that they do not consume VC resources unnecessarily.

The determined number of vProxies required may be based upon the vProxy design, the number of VMs a vProxy is capable of handling in parallel, and policy of the enterprise. In a typical virtual infrastructure, a vProxy can handle twenty-five VMs. However, in an embodiment policy may limit that number to thirteen VMs for each vProxy for optimum performance.

Advantageously, since vProxy management in accordance with the invention is based upon the actual number of VMs protected by a backup server, not on the number of available VMs in the virtual infrastructure, the invention does not depend upon the particular version of the virtual infrastructure in which it is implemented. It may be implemented effectively across all environments and enterprises.

While the foregoing has been with reference to a particular embodiment of the invention, it will be appreciated from the foregoing that changes may be made to this embodiment without departing from the principles of the invention, the scope of which is defined by the appended claims.

The invention claimed is:

1. In a backup system, a method of deploying virtual proxies ("vProxies") in a virtual infrastructure having a plurality of available virtual machines, the backup system comprising a backup server communicating with said virtual infrastructure and with backup storage, the method comprising:
   determining dynamically and automatically by a proxy deployment manager on said backup server an actual number of said virtual machines that are protected by said backup server at a current instant of time; and
   deploying in said virtual infrastructure automatically by said proxy deployment manager in response to said determining a number of virtual proxies that is required at said current instant of time to protect and backup said determined actual number of virtual machines.

2. The method of claim 1 further comprising calculating a quantity of vProxies required for level-1 backup of said virtual infrastructure, and wherein said deploying comprises deploying vProxies considering said quantity.

3. The method of claim 1 further comprising obtaining additional information as to a data change rate corresponding to the percentage of a client file system that changes between backups, and a data ingestion rate corresponding to the number of vProxies required to back up virtual machines in a time allotted by a backup window, and wherein said deploying is based upon said additional information.

4. The method of claim 1, wherein said determining comprises collating virtual machines protected by a plurality of policies of the virtual infrastructure, and said deploying comprises deploying virtual machines considering said collated virtual machines.

5. The method of claim 1, wherein said deploying comprises automatically and dynamically adjusting as required at any instance of time said required deployed number of vProxies based upon changes in said actual number of virtual machines.

6. The method of claim 1, wherein said determining said actual number of virtual machines protected by said backup server comprises querying a media database of said backup server.

7. The method of claim 1 further comprising dynamically re-determining and adjusting said number of deployed vProxies periodically based upon changes in said protected virtual machines.

8. The method of claim 7, wherein said adjusting comprises spawning additional vProxies as needed for increases in said number of virtual machines, and suspending deployed vProxies for decreases in said number of virtual machines.

9. Non-transitory computer readable media storing executable instructions for controlling a computer in a backup system to perform a method of a method of deploying virtual proxies ("vProxies") in a virtual infrastructure having a plurality of available virtual machines, the backup system comprising a backup server communicating with said virtual infrastructure and with backup storage, the method comprising:
  determining dynamically and automatically by a proxy deployment manager on said backup server an actual number of said virtual machines that are protected by said backup server at a current instant of time; and
  deploying in said virtual infrastructure automatically by said proxy deployment manager in response to said determining a number of virtual proxies that is required at said current instant of time to protect and backup said determined actual number of virtual machines.

10. The non-transitory computer readable media of claim 9, wherein said method further comprising calculating a quantity of vProxies required for level-1 backup of said virtual infrastructure, and wherein said deploying comprises deploying vProxies considering said quantity.

11. The non-transitory computer readable media of claim 9, wherein said method further comprises obtaining additional information as to a data change rate corresponding to the percentage of a client file system that changes between backups, and a data ingestion rate corresponding to the number of vProxies required to back up virtual machines in a time allotted by a backup window, and wherein said deploying is based upon said additional information.

12. The non-transitory computer readable media of claim 9, wherein said determining comprises collating virtual machines protected by a plurality of policies of the virtual infrastructure, and said deploying comprises deploying virtual machines considering said collated virtual machines.

13. The non-transitory computer readable media of claim 9, wherein said deploying comprises and dynamically adjusting as required at any instance of time said deployed number of vProxies based upon changes in said actual number of virtual machines.

14. The non-transitory computer readable media of claim 9, wherein said determining said actual number of virtual machines protected by said backup server comprises querying a media database of said backup server.

15. The non-transitory computer readable media of claim 9 further comprising dynamically re-determining and adjusting said number of deployed vProxies periodically based upon changes in said protected virtual machines.

16. The non-transitory computer readable media of claim 15, wherein said adjusting comprises spawning additional vProxies as needed for increases in said number of virtual machines, and suspending deployed vProxies for decreases in said number of virtual machines.

17. A backup system for deploying virtual proxies ("vProxies") in a virtual infrastructure having a plurality of available virtual machines, comprising:
  a backup server comprising a processor and a memory storing executable instructions for implementing a proxy deployment manager; and
  a deduplicated backup storage system,
  the backup server comprising a media database for storing backup-related related components of the VC and that enables selection of particular virtual machines for backup; said proxy deployment manager configured to determine dynamically and automatically an actual number of virtual machines protected by said backup server at a current instance of time, and to deploy automatically in response to determination of said actual number of virtual machines in said virtual infrastructure a number of vProxies that is required to protect and backup said determined actual number of virtual machines.

18. The backup system of claim 17, wherein said proxy deployment manager is further configured to automatically deploy said vProxies to said virtual infrastructure, and to periodically re-determine and adjust said deployed vProxies based upon changed in said protected virtual machines.

19. The backup system of claim 18, wherein said proxy deployment manager is configured to spawn additional vProxies as the actual number of virtual machines increases and to suspend deployed vProxies for decreases in said number of virtual machines.

* * * * *